US012728841B2

(12) United States Patent
Nishijima

(10) Patent No.: US 12,728,841 B2
(45) Date of Patent: Sep. 8, 2026

(54) DRIVING ASSISTANCE DEVICE, DRIVING ASSISTANCE METHOD, AND STORAGE MEDIUM

(71) Applicant: TOYOTA JIDOSHA KABUSHIKI KAISHA, Toyota (JP)

(72) Inventor: Masakazu Nishijima, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/987,126

(22) Filed: Dec. 19, 2024

(65) Prior Publication Data

US 2025/0269846 A1 Aug. 28, 2025

(30) Foreign Application Priority Data

Feb. 22, 2024 (JP) ................................ 2024-025725

(51) Int. Cl.

*B60W 50/14* (2020.01)
*B60W 30/09* (2012.01)
*B60W 50/00* (2006.01)

(52) U.S. Cl.

CPC ............ *B60W 30/09* (2013.01); *B60W 50/14* (2013.01); *B60W 2050/0083* (2013.01); *B60W 2050/143* (2013.01); *B60W 2050/146* (2013.01)

(58) Field of Classification Search

CPC ................. B60W 30/09; B60W 50/14; B60W 2050/0083; B60W 2050/143; B60W 2050/146

See application file for complete search history.

(56) References Cited

U.S. PATENT DOCUMENTS

| | | | | |
|---|---|---|---|---|
| 9,405,727 | B2 | 8/2016 | Nagata | |
| 9,669,760 | B2 | 6/2017 | Hanita et al. | |
| 9,898,929 | B2 | 2/2018 | Harada et al. | |
| 11,175,673 | B2 | 11/2021 | Eshima | |
| 2016/0305785 | A1* | 10/2016 | Nishijima | G01C 7/04 |
| 2020/0207341 | A1 | 7/2020 | Inoue et al. | |
| 2021/0061350 | A1 | 3/2021 | Kinoshita et al. | |
| 2021/0284141 | A1 | 9/2021 | Sugaya | |
| 2021/0284237 | A1 | 9/2021 | Miyano et al. | |
| 2021/0291820 | A1 | 9/2021 | Inoue et al. | |

FOREIGN PATENT DOCUMENTS

| | | | |
|---|---|---|---|
| JP | H1031066 | A | 2/1998 |
| JP | 2001091619 | A | 4/2001 |
| JP | 2009271766 | A | 11/2009 |

* cited by examiner

*Primary Examiner* — Calvin Cheung

(74) *Attorney, Agent, or Firm* — Hunton Andrews Kurth LLP

(57) ABSTRACT

A driving assistance device performs driving assistance for an own vehicle when a predetermined target exists in a driving assistance area that is set ahead of the own vehicle. The driving assistance device is able to make a setting change to increase an area size of the driving assistance area in such a manner that the driving assistance area expands outward from the vehicle. When the driving assistance area is expanded, the driving assistance device makes a setting change to reduce the driving assistance area when it is detected that the vehicle is traveling in any of an auxiliary lane and a through lane of an expressway.

3 Claims, 4 Drawing Sheets

DRIVING ASSISTANCE DEVICE, DRIVING ASSISTANCE METHOD, AND STORAGE MEDIUM

CROSS-REFERENCE TO RELATED APPLICATION

This application claims priority to Japanese Patent Application No. 2024-025725 filed on Feb. 22, 2024, incorporated herein by reference in its entirety.

BACKGROUND

1. Technical Field

The disclosure relates to a driving assistance device, a driving assistance method, and a storage medium.

2. Description of Related Art

For a conventional obstacle detection device, Japanese Unexamined Patent Application Publication No. 2009-271766 discloses a device that detects an obstacle within an obstacle detection region that is set ahead of an own vehicle.

SUMMARY

There are some cases where equipment that is not seen on general roads is installed on expressways, and some of such equipment is difficult to distinguish from a pedestrian or a two-wheel vehicle. Since the conventional obstacle detection device mentioned above does not make a distinction between general roads and expressways, there is a possibility that equipment installed on an expressway is detected as a pedestrian or a two-wheel vehicle and unnecessary driving assistance is performed.

The present disclosure has been made with a focus on such a problem, and an object of the present disclosure is to restrain unnecessary driving assistance from being performed on an expressway.

To solve the problem, a driving assistance device according to an aspect of the present disclosure that performs driving assistance for a vehicle when a predetermined target exists in a driving assistance area that is set ahead of the vehicle, is configured to: be able to make a setting change to increase an area size of the driving assistance area in such a manner that the driving assistance area expands outward from the vehicle; and, when the driving assistance area is expanded, make a setting change to reduce the driving assistance area when it is detected the vehicle is traveling in any of an auxiliary lane and a through lane of an expressway.

A driving assistance method according to an aspect of the present disclosure for performing driving assistance for a vehicle when a predetermined target exists in a driving assistance area that is set ahead of the vehicle, is a driving assistance method wherein it is possible to make a setting change to increase an area size of the driving assistance area in such a manner that the driving assistance area expands outward from the vehicle, the driving assistance method including, when the driving assistance area is expanded, making a setting change to reduce the driving assistance area when it is detected the vehicle is traveling in any of an auxiliary lane and a through lane of an expressway.

A computer program stored in a storage medium according to an aspect of the present disclosure causes a computer to execute processes of: performing driving assistance for a vehicle when a predetermined target exists in a driving assistance area that is set ahead of the vehicle; making a setting change to increase an area size of the driving assistance area in such a manner that the driving assistance area expands outward from the vehicle; and, when the driving assistance area is expanded, making a setting change to reduce the driving assistance area when it is detected that the vehicle is traveling in any of an auxiliary lane and a through lane of an expressway.

According to the aspects of the present disclosure, when it is detected that the own vehicle is traveling in any of an auxiliary lane and a through lane of an expressway, a setting change to reduce the driving assistance area is made. Accordingly, it is possible to restrain unnecessary driving assistance from being performed on an expressway.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure is described with reference to the drawings. Note that in the description below, similar constituent elements are denoted by the same reference signs.

Figure 1:
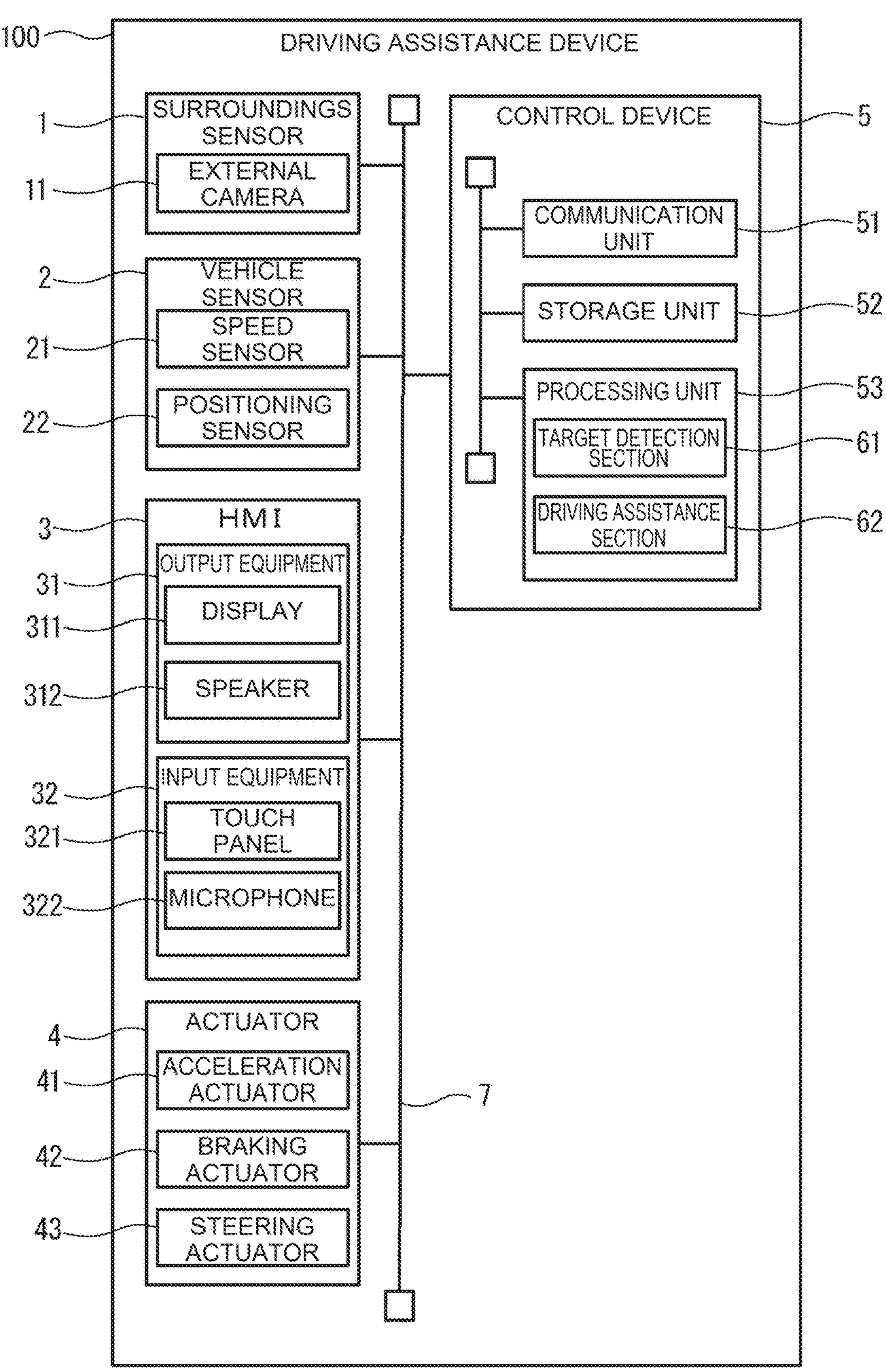
FIG. 1 is a schematic configuration diagram of a driving assistance device according to an embodiment of the present disclosure.

FIG. 1 is a schematic configuration diagram of a driving assistance device 100 according to an embodiment of the present disclosure.

The driving assistance device 100 includes a surroundings sensor 1, a vehicle sensor 2, a human machine interface (HMI) 3, an actuator 4, and a control device 5. The surroundings sensor 1, the vehicle sensor 2, the HMI 3, the actuator 4, and the control device 5 are communicably connected to each other through an in-vehicle network 7 complying with a standard, such as a controller area network.

The surroundings sensor 1 is a sensor for generating surroundings data indicating a situation around a vehicle (hereinafter, referred to as "own vehicle") for which driving assistance is performed by the driving assistance device 100. In the present embodiment, one or more external cameras 11 for capturing an image of surroundings around the own vehicle, including ahead of the own vehicle, are included as the surroundings sensor 1.

The external camera 11 captures images of the surroundings of the own vehicle at a predetermined frame rate (for example, 10 [Hz] to 40 [Hz]) and generates surroundings images in which the surroundings of the own vehicle appear. Each time surroundings images are generated, the external camera 11 transmits the generated surroundings images as surroundings data to the control device 5.

Note that in place of the external camera 11, or in addition to the external camera 11, a ranging sensor that measures a distance to a target such as a vehicle or a pedestrian existing around the own vehicle may be included as the surroundings sensor 1. Examples of the ranging sensor include, for example, a light detection and ranging (LiDAR) that radiates radar light and measures the distance based on the reflected light, and a millimeter-wave radar sensor that radiates radio waves and measures the distance based on the reflected waves, and the like.

The vehicle sensor 2 is a sensor for generating vehicle data indicating a situation of the own vehicle. In the present embodiment, a speed sensor 21 that generates speed data indicating the traveling speed of the own vehicle, a positioning sensor 22 that generates current position data indicating the current position of the own vehicle, such as a latitude and a longitude, and the like are included as the vehicle sensor 2. However, the vehicle sensor 2 is not limited to the sensors mentioned above. The vehicle sensor 2 transmits the acquired various data as vehicle data to the control device 5.

The HMI 3 is a user interface for allowing information to be exchanged between the own vehicle and an occupant of the own vehicle. The HMI 3 includes output equipment 31 for making a notice to the vehicle occupant via a bodily sensation (for example, an optical sensation, a hearing sensation, a tactual sensation, or the like), and input equipment 32 for allowing the vehicle occupant to perform an input operation and a response operation. In the present embodiment, a display or the like (for example, a cluster display, a center display, a head-up display, or the like) 311 and a speaker 312 are included as the output equipment 31, and a touch panel 321 and a microphone 322 are included as the input equipment 32.

The HMI 3 displays information (for example, character information or image information) corresponding to a display signal received from the control device 5 on the display or the like 311, and outputs sound corresponding to a sound signal from the speaker 312. Moreover, the HMI 3 transmits, to the control device 5, data (hereinafter, referred to as "occupant input data") input with a panel or with sound by the vehicle occupant via the input equipment 32.

The HMI 3 may be mounted on the own vehicle beforehand, or may be a terminal such as a smartphone owned by the vehicle occupant. In the latter case, for example, information may be exchanged between the own vehicle and the terminal of the vehicle occupant by communication being performed through near field communication, or information may be exchanged indirectly via an external server (not shown) by communication being performed between the terminal of the vehicle occupant and the server.

The actuator 4 is equipment used for traveling control of the own vehicle. In the present embodiment, an acceleration actuator 41 (for example, at least one of an engine and a motor) that performs acceleration control of the own vehicle, a braking actuator 42 (for example, a hydraulic actuator) that performs braking control of the own vehicle, and a steering actuator 43 (for example, a steering motor) that performs steering control of the own vehicle are included as the actuator 4.

The control device 5 is an electronic control unit (ECU) including a communication unit 51, a storage unit 52 (storage medium), and a processing unit 53.

The communication unit 51 includes interface circuitry for connecting the control device 5 to the in-vehicle network 7. The communication unit 51 supplies various data received from each of the sensors 1, 2 and the HMI 3 to the processing unit 53. Moreover, the communication unit 51 outputs various signals output from the processing unit 53 to the HMI 3, the actuator 4, and the like.

The storage unit 52 includes a storage medium, such as a hard disk drive (HDD), a solid disk drive (SSD), or a semiconductor memory, and stores various computer programs, data, and the like that are used in processing by the data processing unit 53.

The processing unit 53 includes one or more central processing units (CPU) and peripheral circuitry thereof, and executes the various computer programs stored in the storage unit 52. The processing unit 53 is, for example, a processor. The processing unit 53 may further include another operation circuit, such as a logic operation unit, an arithmetic operation unit, or a graphics processing unit. By executing processes according to computer programs, the processing unit 53 functions as a target detection section 61 and a driving assistance section 62 and operates as the functional sections (modules), each implementing predetermined functionality. In the description below, when processes are described by using each of the functional sections 61 to 62 as a subject, the description indicates that the processing unit 53 executes the program that implements each of the functional sections 61 to 62.

Hereinafter, details of specific processes that are executed by the control device 5 are described. In other words, details of each of the functional sections 61 to 62 that are implemented by the processing unit 53 executing the processes according to the program are described.

The target detection section 61 detects a target existing around the own vehicle, based on surroundings data received from the surroundings sensor 1. For example, the target detection section 61 sequentially inputs surroundings images received from the external camera 11 into a discriminator, and thereby detects, in each surroundings image, a region in which there appears any of targets, such as a vehicle, a two-wheel vehicle, a pedestrian, a traffic signal, a traffic sign, a road facility, and a building, as well as a type of each target appearing in the region. The discriminator is, for example, a convolutional neural network (CNN) that includes a plurality of convolutional layers connected in series from an input side toward an output side. The target detection section 61 estimates a distance from the external camera 11 to a target by using a standard size of the target stored in the storage unit 52, which stores standard sizes of targets by target type, and a size of the target detected in the surroundings image, and also calculates a position and a speed of the target by tracking the target detected in the surroundings images in chronological order. Note that a method of detecting a target is not limited to such a method, and the detection may be accomplished in any of various publicly known manners.

The driving assistance section 62 performs driving assistance for a driver of the own vehicle when a predetermined target exists in a driving assistance area (see FIGS. 2A and 2B) that is set ahead of the own vehicle. The predetermined target can be, for example, a target that can move, such as a pedestrian or a two-wheel vehicle, in other words, a target that has the potential to come into contact with the own vehicle. As driving assistance for the driver, for example, the driving assistance section 62 can make various notices, such as a caution notice or a notice prompting steering or deceleration, by using the HMI 3. For driving assistance for the driver, for example, the driving assistance section 62 can also perform traveling control of the own vehicle (for example, steering for avoidance, deceleration, or the like) by using the actuator 4, in addition to or in place of the notification by the HMI 3.

Hereinafter, the driving assistance by the driving assistance section 62 is described in more detail with reference to FIGS. 2A to 3C.

Figure 2A:
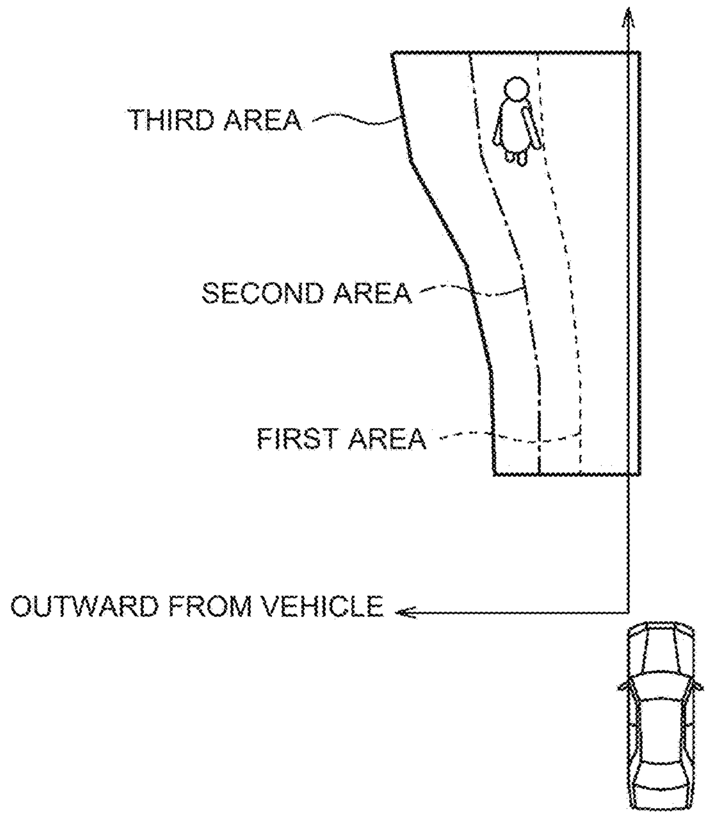
FIG. 2A shows an example of a driving assistance area that is set ahead of an own vehicle on the left.
Figure 2B:
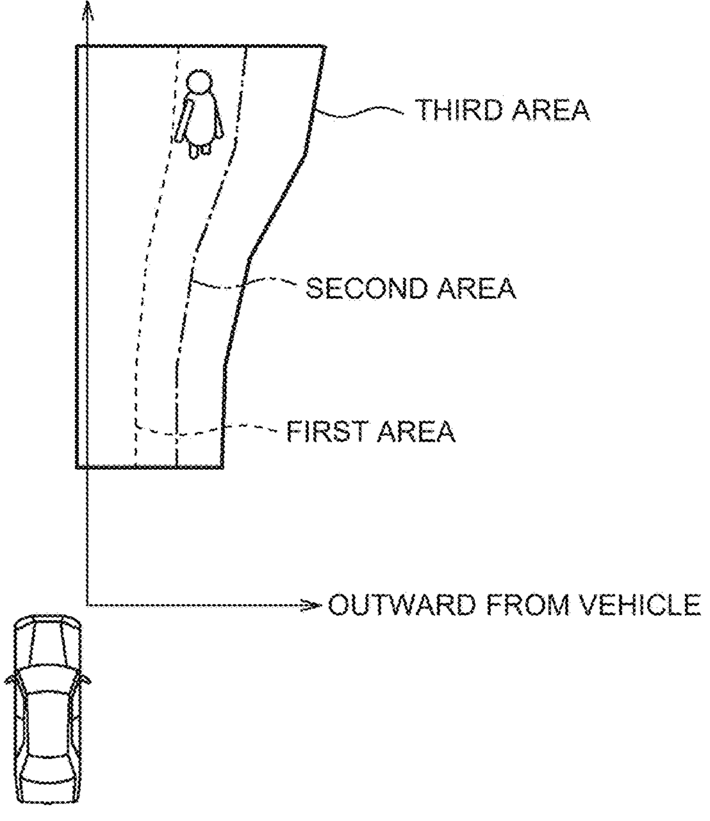
FIG. 2B shows an example of the driving assistance area that is set ahead of the own vehicle on the right.

FIGS. 2A and 2B show examples of a driving assistance area that is set ahead of the own vehicle on the left and on the right.

As shown in FIGS. 2A and 2B, the shape of the driving assistance area that is set ahead of the own vehicle on the left and on the right is bilaterally symmetrical, and the area size of the driving assistance area is configured to be able to be changed stepwise, or continuously, according to preference of the driver. In the present embodiment, the driving assistance area can be changed on a scale of 1 to 3, that is, to a first area, a second area, and a third area in ascending order of area size.

The first area is a predetermined area ahead of the own vehicle on the right and on the left. The second area is an area created by expanding the first area outward from the own vehicle in such a manner as to include the whole first area. The third area is created by expanding the second area outward from the own vehicle in such a manner as to include the whole second area. Accordingly, the smaller the area size of the driving assistance area is made, the more difficult it becomes to detect a predetermined target existing ahead of the own vehicle on the right and on the left. In other words, the smaller the area size of the driving assistance area is made, the lower the degree of detection sensitivity becomes to a predetermined target existing ahead of the own vehicle on the right and on the left. Note that the length of the driving assistance area in the vehicle front-rear direction may be configured to be variable according to the speed of the own vehicle, for example, with time to collision (TTC) taken into consideration, or may be a predetermined length.

Figure 3A:
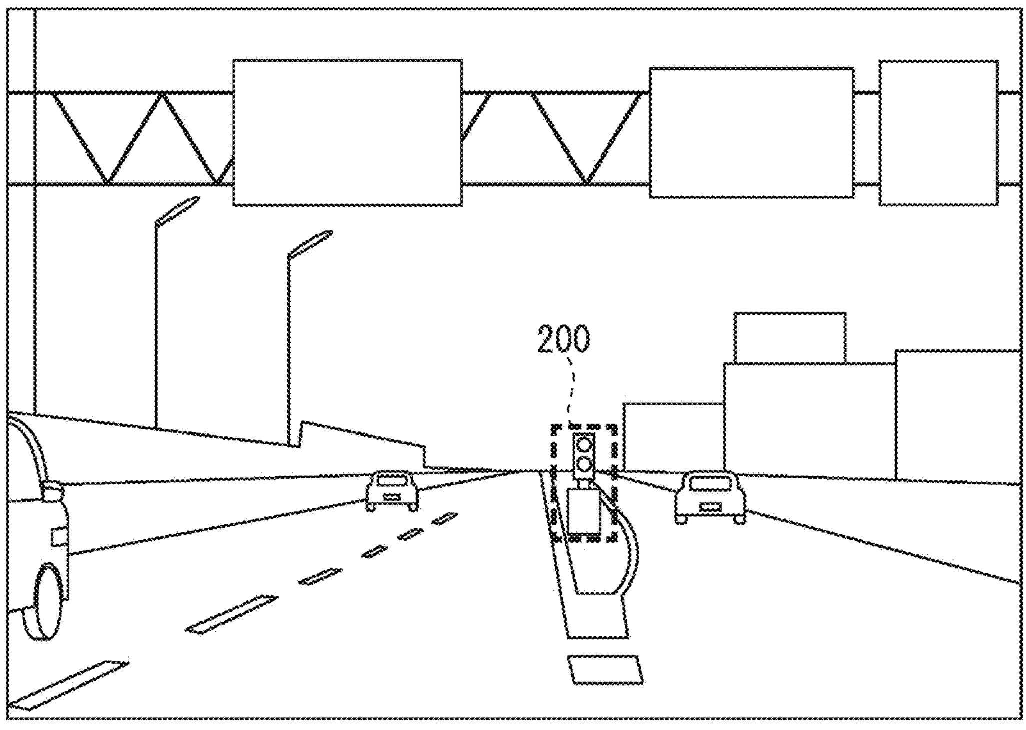
FIG. 3A shows an example of a scene in which caution lights are installed at a division point or the like on a through lane of an expressway.
Figure 3B:
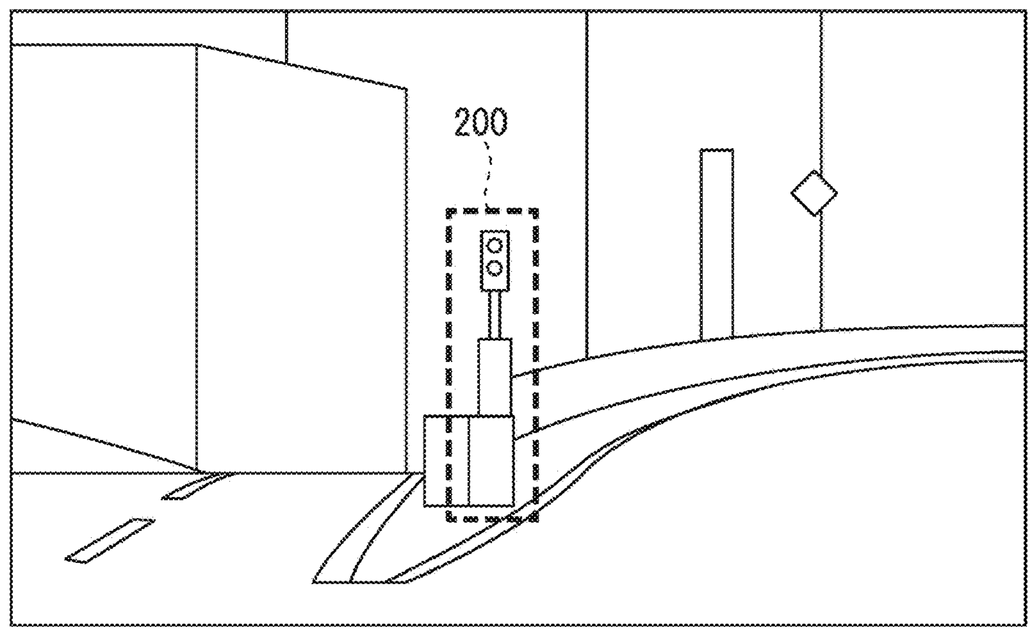
FIG. 3B shows another example of the scene in which caution lights are installed at a division point or the like on a through lane of an expressway.

Incidentally, there are some cases where equipment that is not seen on general roads is installed on expressways. For example, as shown in FIGS. 3A and 3B, there are some cases where caution lights (blinker lights) 200 are installed at a division point or the like on a through lane of an expressway in order to alert a vehicle driver to the existence of the division point by the two vertically arranged lights being alternately illuminated. Since the silhouette of such caution lights 200 is a vertically long silhouette that is similar to the silhouette of a pedestrian, the target detection section 62 can erroneously detect the caution lights 200 as a pedestrian, in some cases. Moreover, the target detection section 62 can recognize a light of the caution lights 200 as a tail lamp or a headlamp of a two-wheel vehicle and erroneously detect the caution lights 200 as a two-wheel vehicle, in some cases.

Figure 3C:
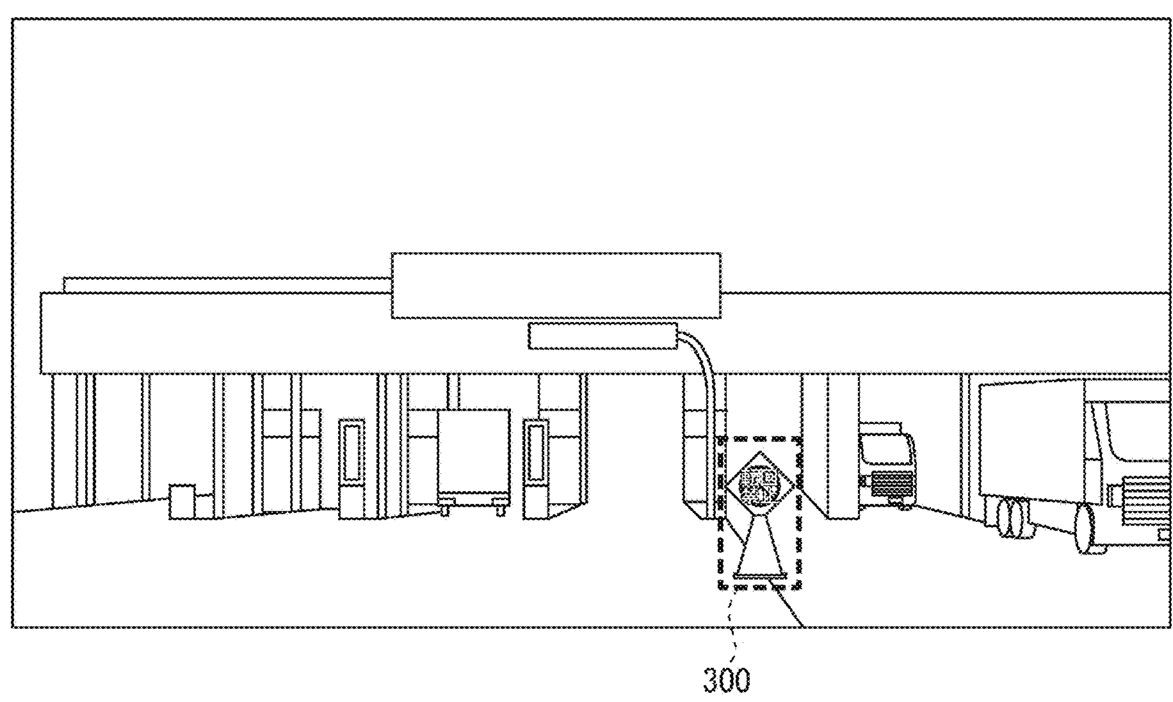
FIG. 3C shows an example of a scene in which a traffic cone for preventing a vehicle from turning is placed in an auxiliary lane of an expressway.

Further, as shown in FIG. 3C, there are some cases where a traffic cone 300 or a pole to prevent a vehicle from turning or the like is placed in the vicinity of an entrance and an exit of a toll gate of an expressway, that is, in an auxiliary lane of an expressway, such as an interchange provided for traffic to diverge from a general road and enter the expressway, or for traffic to exit the expressway and merge into a general road. Since the silhouette of such a traffic cone 300 or pole is also a vertically long silhouette that is similar to the silhouette of a pedestrian, the target detection section 62 can erroneously detect the traffic cone 300 or pole as a pedestrian, in some cases.

Accordingly, if the driving assistance area is wide (that is, if the degree of detection sensitivity is high to a predetermined target existing ahead of the own vehicle on the left and on the right) when the own vehicle is traveling in an auxiliary lane or a through lane of an expressway, there is a possibility that performing of driving assistance increases in frequency due to erroneous detection because the caution lights 200 and the traffic cone 300 or pole, and the like easily appear in the driving assistance area. On the other hand, on expressways, unlike general roads, since targets at risk of collision, such as a pedestrian on a sidewalk, do not exist, there is no risk of collision as a result of a target on a sidewalk moving toward the own vehicle.

Accordingly, in the present embodiment, when the own vehicle is traveling in an auxiliary lane or a through lane of an expressway, the driving assistance area is configured to be set to the first area of the smallest area size.

Figure 4:
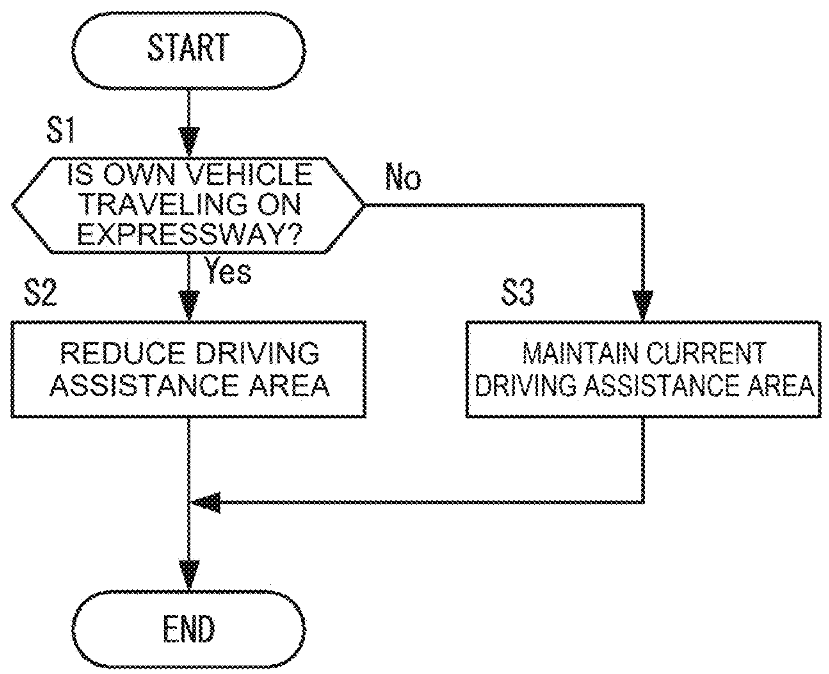
FIG. 4 is a flowchart that describes driving assistance area setting control according to the embodiment of the present disclosure.

FIG. 4 is a flowchart that describes driving assistance area setting control according to the present embodiment, which is performed by the driving assistance section 62 and therefore by the control device 5. The control device 5 performs the present routine in each predetermined operation period ΔT repeatedly.

In step S1, the control device 5 determines whether or not the own vehicle is traveling in an auxiliary lane or a through lane of an expressway. A method of determining whether or not the own vehicle is traveling in an auxiliary lane or a through lane of an expressway is not particularly limited, and the determination may be performed by any of various publicly known methods.

In the present embodiment, when it can be determined that the own vehicle is traveling in an auxiliary lane or a through lane of an expressway, from current position data on the own vehicle and map information, and when it can also be determined that the own vehicle is traveling in an auxiliary lane or a through lane of an expressway, from surroundings images received from the external camera 11 and speed data on the own vehicle, the control device 5 determines that the own vehicle is traveling in an auxiliary lane or a through lane of an expressway. When the own vehicle is traveling in an auxiliary lane or a through lane of an expressway, the control device 5 moves to a process in step S2. When the own vehicle is not traveling in an auxiliary lane or a through lane of an expressway, the control device 5 moves to a process in step S3.

In step S2, when the driving assistance area has been set to an area other than the first area, the control device 5 sets the driving assistance area to the first area. In other words, the degree of detection sensitivity to a predetermined target existing ahead of the own vehicle on the right and on the left is made lower, so that the predetermined target existing ahead of the own vehicle on the right and on the left is prevented from being detected unnecessarily.

In step S3, the control device 5 leaves the driving assistance area unchanged to be a currently set area. Thus, when the own vehicle is not traveling in an auxiliary lane or a through lane of an expressway, since the driving assistance area can be set to an area that the driver prefers, it is possible to perform appropriate driving assistance according to preference of the driver.

The driving assistance device 100 according to the present embodiment described above performs driving assistance for the own vehicle when a predetermined target exists in the driving assistance area that is set ahead of the own vehicle.

The driving assistance device 100 can make a setting change to increase the area size of the driving assistance area in such a manner that the driving assistance area expands outward from the vehicle. When the driving assistance area is expanded, the driving assistance device 100 is configured to make a setting change to reduce the driving assistance area when it is detected that the own vehicle is traveling in an auxiliary lane or a through lane of an expressway. Specifically, according to the present embodiment, when the area size of the driving assistance area at a time when it is detected that the vehicle is traveling in an auxiliary lane or a through lane of an expressway is not a smallest one of the settable area sizes, the driving assistance device 100 is configured to reduce the area size of the driving assistance area to the smallest settable area size.

As described above, according to the present embodiment, since a setting change to reduce the driving assistance area is made when it is detected that the own vehicle is traveling in an auxiliary lane or a through lane of an expressway, it is made less likely that equipment (for example, caution lights 200, a traffic cone 300, or the like) that is deployed mainly on expressways and that is easily confused by the target detection section 61 with a pedestrian, a two-wheel vehicle, or the like appears in the driving assistance area. Accordingly, on expressways, it is possible to restrain unnecessary driving assistance from being performed as a result of such equipment being erroneously detected as a pedestrian or a two-wheel vehicle.

Although an embodiment of the present disclosure has been described hereinabove, the embodiment illustrates only part of application examples of the present disclosure, and is not intended to limit the technical scope of the present disclosure to the specific configurations in the embodiment.

Moreover, for example, in the embodiment, the computer programs that are executed by the control device 5 may be provided in a form of being recorded on a computer-readable removable recording medium, such as a semiconductor memory, a magnetic recording medium, or an optical recording medium.

What is claimed is:

1. A driving assistance device comprising a processor, the driving assistance device being configured to perform driving assistance for a vehicle when a predetermined target exists in a driving assistance area that is set ahead of the vehicle, the driving assistance device being configured to:

make a setting change to increase an area size of the driving assistance area in such a manner that the driving assistance area expands outward from the vehicle; and when the driving assistance area is expanded and when the area size of the driving assistance area at a time when the driving assistance device detects that the vehicle is traveling in any of an auxiliary lane and a through lane of an expressway is not a smallest one of settable area sizes, make a setting change to reduce the area size of the driving assistance area to the smallest settable area size.

2. A driving assistance method for performing driving assistance for a vehicle when a predetermined target exists in a driving assistance area that is set ahead of the vehicle:

making a setting change to increase an area size of the driving assistance area in such a manner that the driving assistance area expands outward from the vehicle; and when the driving assistance area is expanded and when the area size of the driving assistance area at a time when the vehicle is detected to be traveling in any of an auxiliary lane and a through lane of an expressway is not a smallest one of settable area sizes, making a setting change to reduce the area size of the driving assistance area to the smallest settable area size.

3. A non-transitory storage medium storing a computer program causing a computer to execute processes of:

performing driving assistance for a vehicle when a predetermined target exists in a driving assistance area that is set ahead of the vehicle;

making a setting change to increase an area size of the driving assistance area in such a manner that the driving assistance area expands outward from the vehicle; and when the driving assistance area is expanded and when the area size of the driving assistance area at a time when the vehicle is detected to be traveling in any of an auxiliary lane and a through lane of an expressway is not a smallest one of settable area sizes, making a setting change to reduce the area size of the driving assistance area to the smallest settable area size.

* * * * *